Oct. 7, 1958  K. W. NELSON  2,855,256
SUPPORTING LEG STRUCTURE
Filed Dec. 26, 1956
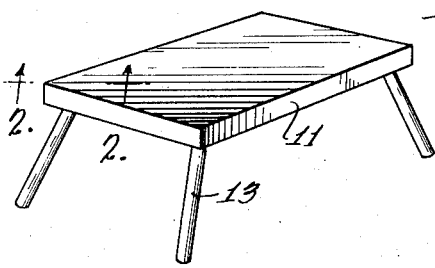
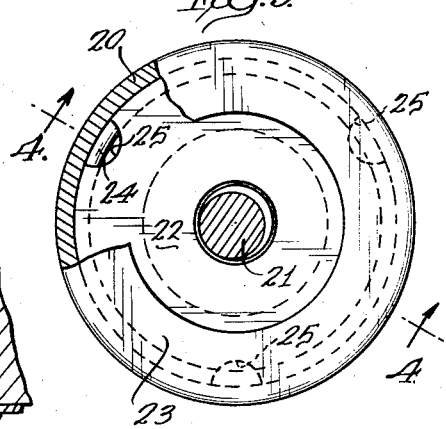
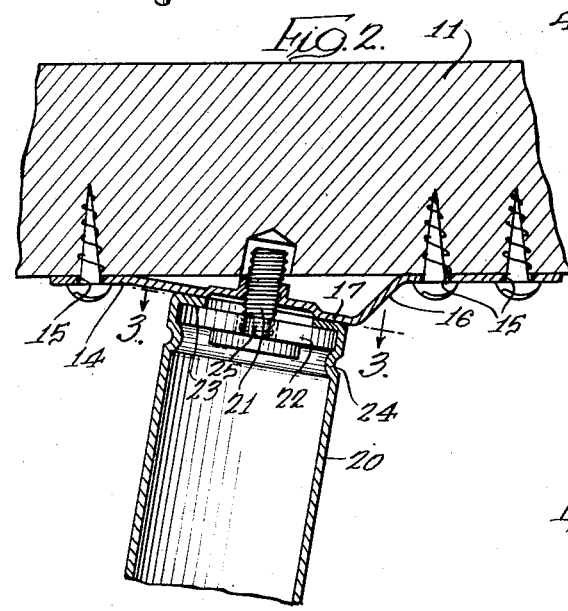
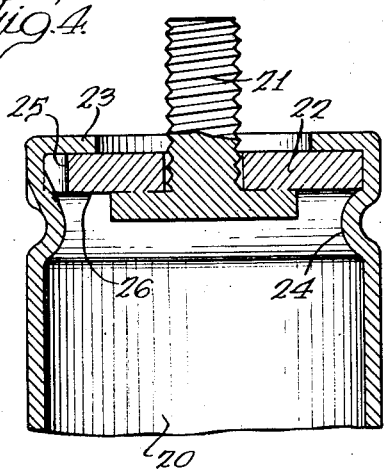
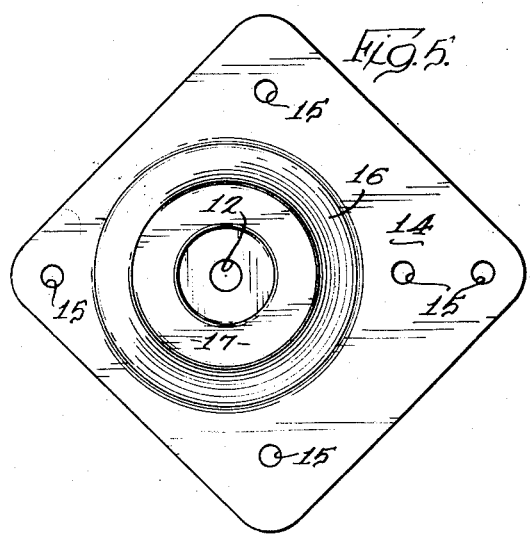
INVENTOR.
Kenneth W. Nelson
BY
Atty's.

United States Patent Office 2,855,256
Patented Oct. 7, 1958

2,855,256

SUPPORTING LEG STRUCTURE

Kenneth W. Nelson, Chicago, Ill., assignor to Rada Products Company, a corporation of Illinois Application December 26, 1956, Serial No. 630,592

6 Claims. (Cl. 311—114)

The invention relates generally to a supporting leg structure and more particularly to a disconnectable leg structure.

More and more designers and manufacturers are turning to metallic tubing for the supporting leg structure in furniture and cabineted devices such as television receivers, radios, radio-phonograph combinations and the like. Further, because of its light weight and other desirable characteristics, such as its ability to be anodized, aluminum tubing is preferred. However, aluminum has the disadvantage that it cannot be satisfactorily welded thereby creating a problem not present with certain other metals.

It is therefore one object of this invention to provide a new and improved metallic supporting leg structure of a construction equally adaptable to be made of aluminum as well as other metals.

Another object is to provide a metallic supporting leg structure attachable or detachable by a simple bolting operation in which the bolt is held both against loss from the tubing forming the leg and against rotation relative thereto by simple means requiring no welding.

Another object is to provide a supporting leg structure detachable by a simple bolting operation which, in assembled condition, has an annular portion of the tubing forming the leg proper tightly clamped between the head of the bolt or means rigid therewith and a part of the supporting structure fixedly attached to the object being supported.

A further object is to provide a supporting leg structure detachable by a simple bolting operation in which the bolt is rigid with a disk, the disk in turn being held against axial and rotational movement relative to the tubing forming the leg proper by deformation of the tubing.

Other objects and advantages will become apparent from the following detailed description taken in connection with the accompanying drawing, in which:

Fig. 1 is a perspective view of a table supported by leg structures embodying the features of this invention.

Fig. 2 is a fragmentary and enlarged sectional view taken approximately along the line 2—2 of Fig. 1.

Fig. 3 is a further enlarged end elevational view, partially broken away, of the leg proper.

Fig. 4 is a sectional view taken along the line 4—4 of Fig. 3.

Fig. 5 is a a bottom plan view of the member to which the leg proper is attached.

While the invention is susceptible of various modifications and alternative constructions, it is shown in the drawings and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

As shown in the drawings for purposes of disclosure, the supporting leg structure comprises generally means 10 formed in or attached to an object 11, such as a table or a cabinet, the means including particularly a threaded aperture 12. Forming the leg proper is a generally tubular member 13 readily attachable to or detachable from the object 11 by a simple bolting or threading operation and preferably, though not necessarily, extending from the means 10 in a direction to form a small angle to the perpendicular.

As stated above, a principal part of the means 10 is the threaded aperture 12 which could be formed directly in the object 11. Inasmuch, however, as that portion of the object 11 to which the supporting leg structure is attached is frequently, if not customarily, made of wood which does not lend itself to the formation of comparatively fine threads in an aperture, the threaded aperture 12 is preferably formed in some attachable and metallic means. Herein this means 10 takes the form of a generally rectangular plate 14 provided with an aperture 15 in each of its corners for the reception of a screw or similar device for more or less permanently securing the plate to the bottom or under surface of the object 11. For purposes that will later become apparent, this plate has a generally circular, upset portion 16 progressing in degree of upsetting from one corner of the plate (see Fig. 2) as it progresses inwardly. The upset portion has an annular, generally flat surface 17 lying in a plane forming a small angle with the plane of the plate as a whole, this annular surface being generally concentric with the threaded aperture 12.

The leg proper of the supporting leg structure, indicated generally by the reference character 13, comprises a length of metallic tubing 20 (see Fig. 4). Because of its light weight and other desirable characteristics, such as the ability to be anodized, the tubing 20 is frequently and preferably made of aluminum. In turn, however, the employment of aluminum creates certain problems in that it does not lend itself to welding and when employed in conjunction with certain other metals, notably ferrous metals, sets up a corroding action. Herein means is provided for readily attaching and detaching the leg proper which means is suitable for use with tubing 20 regardless of the metal of which it is composed, and at the same time is particularly adapted for use with aluminum tubing in that the need for welding, brazing and the like customarily employed in structures of this character is obviated.

The leg proper is attached or detached by a simple bolting or threading operation. To that end the means for attaching the leg proper includes a stud or bolt 21 threadable into the aperture 12. Rigid with the stud 21 is a member 22 receivable within that end of the tubing 20 that is adjacent the object 11 when attached and will for convenience herein be referred to as the upper end. To retain the member 22 and the stud 21 against movement in one direction longitudinally of the tubing, more particularly outwardly, the tubing at its upper end is given or provided with a first deformation which herein takes the form of an inturned flange 23 extending normal to the axis of the tubing. This flange extends radially inwardly far enough to overlie the member 22 to a considerable extent and also provides a flat annular surface for cooperation with the annular surface 17 on the upset portion of the plate 14. A second deformation is provided in the tubing spaced just inwardly of the member 22 to retain the member against movement longitudinally of the tubing in an inward direction. This deformation herein takes the form of an inwardly extending bead 24.

Preferably the stud 21 is held nonrotatably relative to the tubing 20 in order that the leg proper may be attached to or detached from the object 11 by simple rotation of the tubing 20 and without the need for any special tool that could be inserted upwardly through the tubing 20 and into engagement with some portion of the member 22 or the stud 21 for rotating the stud directly. To that end the member 22 is shaped and the tubing is given a cooperating deformation. Generally the tubing 20, particularly at the upper end, that is, the end to be mounted adjacent the object 11, is cylindrical. Member 22 therefore is made circular with a diameter just slightly less than the internal diameter of the tubing 20. At spaced points throughout its periphery the member 22 is formed with depressions or notches 25 which preferably open through the inner face 26 of the member 22. In this way, when the bead 24 is rolled into the tubing 20, a portion of the tubing is drawn into each notch or depression 25, as best seen in Fig. 4. In this way the stud 21 through the member 22, which in effect constitutes the head thereof, is held against rotation relative to the tubing 20.

In use the plate 14 is usually attached to the object 11 at the factory, with the object 11 then shipped with the leg proper 13 detached so as to save shipping space. Upon arrival at the retail store, or at the customer if the sale is direct, the leg proper 13 is easily and quickly attached simply by threading the stud 21 into the aperture 12 in the plate 14. No special tools are required, it is only necessary that the recipient of the object 11 grasp the leg proper 13 in his hand and rotate the same. It is to be noted that as the stud is tightened the flange 23 is clamped between the member 22 and the annular surface 17 thereby providing a very rigid and stable attachment of the leg proper to the object 11. Because of this clamping action, it is not necessary that the member 22 have any great axial length, as has been customary in the past, in order to provide strength and stability to the leg proper but it can, as here, be a narrow, disk-like member. This construction also has the additional advantage that as the stud is tightened the increasing frictional engagement between the member 22 and the flange 23 will cause the stud 21 to rotate with the tubing 20, thereby reducing the strain that is placed on the connection between the tubing and the member 22 holding the two against relative rotation.

I claim:

1. A leg structure for supporting an object, comprising, in combination, means fixedly attachable to the under side of an object to be supported and having a threaded aperture therein, a length of tubing forming the leg proper, said tubing at the end adjacent said means having an inturned flange, and means for detachably securing said tubing to said first named means including a stud threadable into said threaded aperture and means rigid with said stud fully within said end of the tubing clamping said inturned flange tightly between it and said first named means upon threading of said stud into said aperture.

2. A detachable leg structure for an object provided with a threaded aperture, comprising a length of tubing forming the leg proper, said tubing at the end adjacent the object having an inturned flange, and means for detachably securing said tubing to the object including a stud threadable into the threaded aperture and means rigid with said stud clamping said inturned flange tightly between it and the object upon threading of said stud into the aperture.

3. A detachable leg structure for an object provided with a threaded aperture, comprising a length of tubing forming the leg proper and means for detachably securing said tubing to the object including a headed stud threadable into the threaded aperture, an inturned flange on the end of said tubing adjacent the object overlying the head of said stud to limit axial movement of said stud in one direction axially of said tubing, a deformation in said tubing limiting movement of said stud in the opposite direction axially of said tubing, and means positively precluding rotational movement of said stud relative to said tubing to permit threading of said stud into the threaded aperture by rotation of said tubing, said stud head clamping said flange between it and the object to be supported upon threading of said stud into the aperture.

4. In a detachable leg structure, a length of tubing forming the leg proper and means for detachably securing said tubing to the object to be supported, including a threaded stud, a first deformation in said tubing limiting axial movement of said stud in one direction longitudinally of said tubing, a second deformation of in said tubing limiting axial movement of said stud in the opposite direction longitudinally of said tubing, disk-like means rigid with said stud, and an additional deformation in said tubing cooperating with said disk-like means to hold said stud against rotation relative to said tubing.

5. In a detachable leg structure for an object, a length of metallic tubing forming the leg proper, said tubing being cylindrical at the end to be mounted adjacent the object to be supported, and means for detachably securing said tubing to the object, including a threaded stud, a circular member rigid with said stud and having a diameter just slightly smaller than the internal diameter of the cylindrical end of said tubing to be receivable within said end, an inturned flange on said tubing adjacent said end and overlying said circular member to prevent movement thereof in a direction outwardly of said end, a radially inwardly extending bead spaced from said flange by the axial dimension of said circular member to hold said member against movement axially of the tubing inwardly from said end, depressions in the peripheral face of said circular member, and inward deformations in said tubing extending into the depressions to retain said member against rotation relative to said tubing to permit threading of said stud into a threaded aperture in the object to be supported by rotation of said tubing.

6. A leg structure for supporting an object comprising, in combination, a plate fixedly attachable to the under side of an object to be supported, said plate having an upset surface lying in a plane disposed at an angle to the plane of the plate and a threaded aperture opening through said surface, a length of tubing forming the leg proper, said tubing at the end adjacent said plate having an inturned flange, and means for detachably securing said tubing to the object, including a stud threadable into the threaded aperture, a circular member rigid with said stud, said circular member having a diameter smaller than the internal diameter of said tubing and larger than the internal diameter of said flange to be retained by said flange against movement in one direction axially of said tubing, a deformation in said tubing limiting movement of said stud in the opposite direction axially of said tubing, and means securing said stud against rotational movement relative to said tubing to permit threading of said stud into the threaded aperture by rotation of said tubing, said member and stud clamping said flange between said member and the upset portion of said plate to mount said length of tubing rigidly but at an angle to the plane of said plate.

References Cited in the file of this patent

UNITED STATES PATENTS

| | | |
|---|---|---|
| 205,746 | Houston | July 9, 1878 |
| 2,545,347 | Embree | Mar. 13, 1951 |
| 2,698,775 | Courtwright | Jan. 4, 1955 |
| 2,738,246 | Hogan | Mar. 13, 1956 |